(12) United States Patent
Kwon et al.

(10) Patent No.: US 8,566,813 B2
(45) Date of Patent: Oct. 22, 2013

(54) METHOD AND SYSTEM GENERATING EXECUTION FILE SYSTEM DEVICE

(75) Inventors: Ki-hyoun Kwon, Hwasung-si (KR); Jaydeep subhash Patil, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 941 days.

(21) Appl. No.: 12/693,560

(22) Filed: Jan. 26, 2010

(65) Prior Publication Data

US 2010/0229164 A1 Sep. 9, 2010

(30) Foreign Application Priority Data

Mar. 3, 2009 (KR) .................. 10-2009-0018125

(51) Int. Cl.
*G06F 9/44* (2006.01)
*G06F 9/45* (2006.01)

(52) U.S. Cl.
USPC ........................... 717/162; 717/131; 717/158

(58) Field of Classification Search
None
See application file for complete search history.

(56) References Cited

U.S. PATENT DOCUMENTS

| | | | | |
|---|---|---|---|---|
| 6,006,033 A * | 12/1999 | Heisch | ............. | 717/158 |
| 6,658,654 B1 * | 12/2003 | Berry et al. | ............. | 717/131 |
| 7,343,598 B2 * | 3/2008 | Chilimbi et al. | ............. | 717/158 |
| 7,512,738 B2 * | 3/2009 | Balakrishnan et al. | ....... | 711/132 |
| 7,895,588 B2 * | 2/2011 | Rossmann | ............. | 717/162 |
| 2001/0039653 A1 * | 11/2001 | Egashira | ............. | 717/9 |
| 2004/0111708 A1 * | 6/2004 | Calder et al. | ............. | 717/131 |
| 2005/0155022 A1 * | 7/2005 | DeWitt et al. | ............. | 717/131 |
| 2006/0070046 A1 * | 3/2006 | Balakrishnan et al. | ....... | 717/138 |
| 2007/0150881 A1 * | 6/2007 | Khawand et al. | ............. | 717/162 |
| 2007/0250827 A1 * | 10/2007 | Ohyama et al. | ............. | 717/162 |
| 2007/0256066 A1 * | 11/2007 | Nakaike et al. | ............. | 717/158 |
| 2008/0313624 A1 * | 12/2008 | Iwamoto | ............. | 717/162 |

FOREIGN PATENT DOCUMENTS

| | | |
|---|---|---|
| JP | 2005122452 A | 5/2005 |
| JP | 2007213257 A | 8/2007 |
| KR | 1020050076020 A | 7/2005 |

OTHER PUBLICATIONS

Zhang et al. Program-level Adaptive Memory Management, Proceedings of the 5th international symposium on Memory management, 2006, pp. 174-183, Retrieved on [Jun. 14, 2013], Retrieved from the Internet: URL<http://dl.acm.org/citation.cfm?id=1133979>.*

Schwarz et al. PLTO: A LinkTime Optimizer for the Intel IA32 Architecture, Proc. 2001 Workshop on Binary Translation (WBT-2001). 2001, Retrieved on [Jun. 14, 2013] Retrieved from the Internet: URL<http://secsem.cs.arizona.edu/~debray/Publications/plto.pdf>.*

* cited by examiner

*Primary Examiner* — Thuy Dao
*Assistant Examiner* — Cheneca Smith
(74) *Attorney, Agent, or Firm* — Volentine & Whitt, PLLC

(57) ABSTRACT

Provided is a method and system generating an execution file. The method includes determining number-of-calls information for a number of functions and then generating the execution file by locating the functions based on the number-of-calls information.

11 Claims, 12 Drawing Sheets

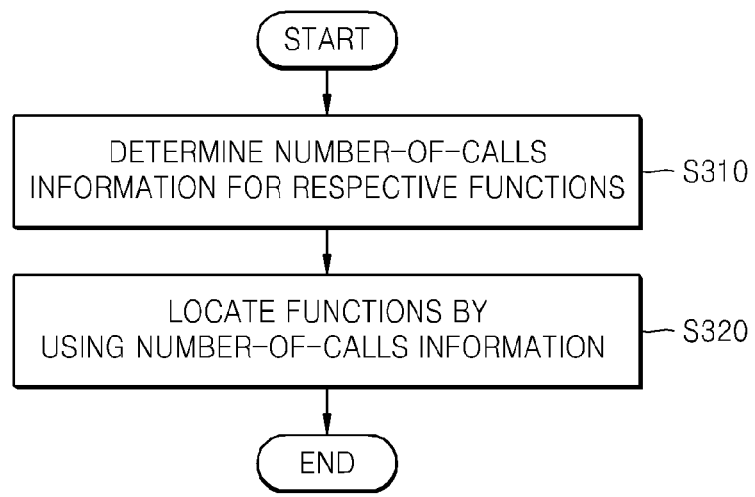

FIG. 4A

| FUNCTION NAME | SIZE INFORMATION [byte] | NUMBER-OF -CALLS INFORMATION | CUMULATIVE SIZE [byte] | CUMULATIVE NUMBER OF CALLS |
|---|---|---|---|---|
| A | 50 | 260 | 50 | 260 |
| B | 220 | 225 | 270 | 485 |
| C | 100 | 129 | 370 | 614 |
| D | 80 | 122 | 450 | 736 |
| E | 400 | 103 | 850 | 839 |
| F | 130 | 99 | 980 | 938 |
| G | 120 | 95 | 1100 | 1033 |
| H | 300 | 85 | 1400 | 1118 |
| I | 50 | 65 | 1450 | 1183 |
| J | 440 | 61 | 1890 | 1244 |
| K | 10 | 52 | 1900 | 1296 |
| L | 100 | 22 | 2000 | 1318 |

FIG. 5A

| FUNCTION NAME | SIZE INFORMATION [byte] | NUMBER-OF-CALLS INFORMATION | CUMULATIVE SIZE [byte] | CUMULATIVE NUMBER OF CALLS |
|---|---|---|---|---|
| A | 50 | 260 | 50 | 260 |
| B | 220 | 225 | 270 | 485 |
| C | 100 | 129 | 370 | 614 |
| D | 80 | 122 | 450 | 736 |
| E | 400 | 103 | 850 | 839 |
| F | 130 | 99 | 980 | 938 |
| K | 10 | 52 | 990 | 990 |
| G | 120 | 95 | 1110 | 1085 |
| H | 300 | 85 | 1410 | 1170 |
| I | 50 | 65 | 1460 | 1235 |
| J | 440 | 61 | 1900 | 1296 |
| L | 100 | 22 | 2000 | 1318 |

FIG. 7A

| FUNCTION NAME | SIZE INFORMATION [byte] | NUMBER-OF-CALLS INFORMATION | CALL DEGREE | CUMULATIVE SIZE [byte] | CUMULATIVE NUMBER OF CALLS |
|---|---|---|---|---|---|
| A | 50 | 260 | 5.20 | 50 | 260 |
| D | 80 | 122 | 1.53 | 130 | 382 |
| I | 50 | 65 | 1.30 | 180 | 447 |
| C | 100 | 129 | 1.29 | 280 | 576 |
| B | 220 | 225 | 1.02 | 500 | 801 |
| G | 120 | 95 | 0.79 | 620 | 896 |
| F | 130 | 99 | 0.76 | 750 | 995 |
| K | 80 | 52 | 0.65 | 830 | 1047 |
| H | 300 | 85 | 0.28 | 1130 | 1132 |
| E | 400 | 103 | 0.26 | 1530 | 1235 |
| L | 100 | 22 | 0.22 | 1630 | 1257 |
| J | 440 | 61 | 0.14 | 2070 | 1318 |

FIG. 8A

| FUNCTION NAME | SIZE INFORMATION [byte] | NUMBER-OF-CALLS INFORMATION | CALL DEGREE | CUMULATIVE SIZE [byte] | CUMULATIVE NUMBER OF CALLS |
|---|---|---|---|---|---|
| A | 50 | 260 | 5.20 | 50 | 260 |
| D | 80 | 122 | 1.53 | 130 | 382 |
| I | 50 | 65 | 1.30 | 180 | 447 |
| C | 100 | 129 | 1.29 | 280 | 576 |
| B | 220 | 225 | 1.02 | 500 | 801 |
| G | 120 | 95 | 0.79 | 620 | 896 |
| F | 130 | 99 | 0.76 | 750 | 995 |
| K | 80 | 52 | 0.65 | 830 | 1047 |
| L | 100 | 22 | 0.22 | 930 | 1069 |
| E | 400 | 103 | 0.26 | 1330 | 1172 |
| H | 300 | 85 | 0.28 | 1630 | 1257 |
| J | 440 | 61 | 0.14 | 2070 | 1318 |

METHOD AND SYSTEM GENERATING EXECUTION FILE SYSTEM DEVICE

CROSS-REFERENCE TO RELATED APPLICATION

This application claims the benefit of Korean Patent Application No. 10-2009-0018125 filed on Mar. 3, 2009, the subject matter of which is hereby incorporated by reference.

BACKGROUND

The inventive concept relates to a method of generating an execution file and a system device. More particularly, the inventive concept relates to a method of generating an execution file by locating a function according to a predetermined criterion, and a system using this method.

Generally, a programming language generates an execution file including at least one function through compiling, assembling, and linking processes. The execution file is stored in a memory.

SUMMARY

In one embodiment, the inventive concept provides a method of generating an execution file for an application program comprising a plurality of functions, the method comprising; determining respective number-of-calls information for each one of the plurality of functions, and generating the execution file by locating in memory each one of the plurality of functions according to its respective number-of-calls information, wherein the higher a number-of-calls information value for a respective function in the plurality of functions is, the more frequently the respective function is called by one or more functions in the plurality of functions.

In a related aspect, the memory comprises a first memory region addressable by a single-word command and locating in memory each one of the plurality of functions comprises sequentially locating the plurality of functions on a function by function basis beginning at a start address for the first memory region in a descending order according to corresponding number-of-calls information values and beginning with a highest number-of calls information value.

In another related aspect, the inventive concept provides for determining the respective number-of-calls information for each one of the plurality of functions and comprises, for each one of the plurality of functions equating an actual number of calls made during execution of the application program to the one function by one or more other functions in the plurality of functions to its number-of-calls information.

In another related aspect, the inventive concept provides for determining the respective number-of-calls information for each one of the plurality of functions and comprises, for each one of the plurality of functions determining an actual number of calls made during execution of the application program to the one function by one or more other functions in the plurality of functions and applying at least one weighting factor to at least a portion of the actual number of calls to define its number-of-calls information.

In another related aspect, the inventive concept provides for determining size information for each one of the plurality of functions, and generating the execution file by locating in memory each one of the plurality of functions according to its respective number-of-calls information and size information, wherein the higher a number-of-calls information value for a respective function in the plurality of functions is, the more frequently the respective function is called by one or more functions in the plurality of functions.

In another related aspect, the inventive concept further provides; generating a call degree for each one of the plurality of functions using the number-of-calls information and the size information, and generating the execution file by locating in memory each one of the plurality of functions according to its call degree.

In another embodiment, the inventive concept provides a method of generating an execution file for an application program comprising a plurality of functions, the method comprising; determining respective number-of-calls information and size information for each one of the plurality of functions, and generating the execution file by locating each one of the plurality of functions in a memory, wherein the memory comprises a first memory region addressable by a single-word command. The generation of the execution file comprises; (a) sequentially locating the plurality of functions on a function by function basis beginning at a start address for the first memory region in a descending order according to corresponding number-of-calls information values and beginning with a highest number-of-calls information value, wherein the higher a number-of-calls information value for a respective function in the plurality of functions is, the more frequently the respective function is called by one or more functions in the plurality of functions, (b) upon sequentially locating a number of included functions sufficient to fill the first memory region, identifying a last included function and a list of yet to be included functions, (c) determining a remaining space value in the first memory region prior to locating the last included function, (d) comparing size information for each one of the yet to be included functions with the remaining space value, and (e) locating at least one of the yet to be included functions having size information less than the remaining space value in the first memory region before locating the last included function in the first memory value.

In another embodiment, the inventive concept provides a system comprising; a memory configured to store an execution file, a linker configured to determine number-of-calls information for each one of a plurality of functions and generate the execution file by sequentially locating in the memory the plurality of functions based on the number-of-calls information, and a microprocessor calling at least one of the plurality of functions located in the execution file.

BRIEF DESCRIPTION OF THE DRAWINGS

Embodiments of the inventive concept will be more clearly understood from the following detailed description taken in conjunction with the accompanying drawings in which:

FIG. 2 illustrates an exemplary single-word command;

FIG. 3 is a flowchart generally summarizing a method for generating an execution file according to an embodiment of the inventive concept;

FIG. 4A is a table showing an order in which functions are located according to an embodiment of the inventive concept;

FIG. 5A is a table showing an order in which functions are located according to another embodiment of the inventive concept;

FIG. 7A is a table showing an order in which functions are located according to another embodiment of the inventive concept;

FIG. 8A is a table showing an order in which functions are located according to another embodiment of the inventive concept;

DETAILED DESCRIPTION OF THE EMBODIMENTS

To fully understand operational advantages of the inventive concept and objects achieved by embodiments of the inventive concept, the accompanying drawings illustrating the embodiments of the inventive concept and details described in the accompanying drawings should be referred to.

Hereinafter, embodiments of the inventive concept will be described with reference to the accompanying drawings to describe the inventive concept in some additional detail. Throughout the written description and drawings, like reference numbers and labels are used to denote like or similar elements and/or steps.

Figure 1:
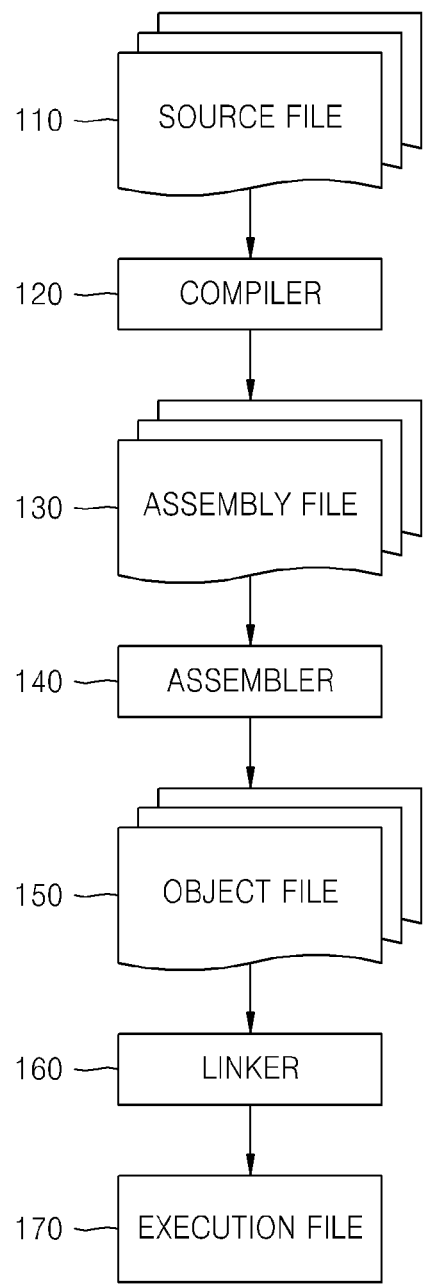
FIG. 1 schematically illustrates a process flow for development of an execution file within application program.

Figure (FIG.) 1 schematically illustrates a flow process for developing an execution file within the overall operation of an application program. Referring to FIG. 1, a compiler 120 generates assembly files 130 from source files 110, and an assembler 140 converts the assembly files 130 into relocatable machine codes to generate object files 150. A linker 160 links all of the object files 150 to generate an execution file 170. That is, the execution file 170 is generated by linking all of the object files 150 at the linker 160 to thereby develop an executable portion (or result, or product) of the application program.

The linker 160 determines the positions and addresses of respective parameters, symbols, and functions within the application program. The linker 160 may analyze so-called "number-of-calls" information and size information for each of the functions during a process of (1) designating (or allocating) memory spaces in which the respective functions will be stored and (2) determining addresses for "calls" (i.e., evocations of) the respective functions.

FIG. 2 illustrates one possible example of a single-word command 200 that may be used within the foregoing process. Referring to FIG. 2, the single-word command 200 may include command bits 0-5 defined with 6 bits, and address bits 6-15 defined with 10 bits. If an address is to be designated by using 10 bits, functions having start addresses within a $2^{10}$-byte space may be "called" using the single-word command 200. In the following description, a method of locating the functions will be described under an assumption that a function is "callable" by using such a single-word command 200. However, as will be readily appreciated by those skilled in the art, the scope of the inventive concept is not limited by the use of single-word command 200, as illustrated in FIG. 2. Any reasonable number of address bits might be used. For example, if "N" address bits are designated in a single-word command, the start addresses for corresponding functions may be designated in a $2^N$-byte space of a memory in a manner described below.

FIG. 3 is a flowchart summarizing a method of generating an execution file according to an embodiment of the inventive concept. Referring to FIG. 3, the illustrated method comprises determining number-of-calls information for each of the functions (S310) and thereafter, locating the functions using the number-of-calls information (S320).

As described with reference to FIG. 1, since the linker 160 knows number-of-calls information for all of the functions, the number-of-calls information for each of the functions may use the number-of-calls information for all of the functions, analyzed by the linker 160 shown in FIG. 1. In one embodiment, for example, the number-of-calls information for each function is the sum of the numbers calls made to a particular function by the other functions.

As further examples, the number-of-calls information associated with each function may be determined by using one of the following two methods. First, the number-of-calls information may be determined by the actual number of times the corresponding function is called by all calling functions. Second, the number-of-calls information may be determined using a defined weighting of actual calls made to the function by all calling functions.

In these contexts, a function A is called by a function B on the assumption that the function A exists in a loop of the function B and is repetitively called at some calling point in the loop of the function B. Thus, according to the first approach, each time the function A is called in the loop of function B, it is determined that function A has been called once. According to the second method, however, each time the function A is called in the loop of the function B, it is determined that the function A is called 1 times its weighting factor, were the weighting factor is 1 or more. Thus, the number-of-calls information is determined according to the second approach, the number-of-calls information may be larger in value than the number-of-calls information determined according to the first approach. It all depends on the actual value assigned to the weighting factor.

After the number-of-calls information for each of the functions is determined, the functions are located by using the number-of-calls information to thereby generate an execution file (S320). In this manner, an execution file may be generated by sequentially locating each one of the plurality of functions in an order defined according to the number-of-calls information. For example, respective functions may be located on a largest value by next largest value for respective number-of-calls information.

Figure 4B:
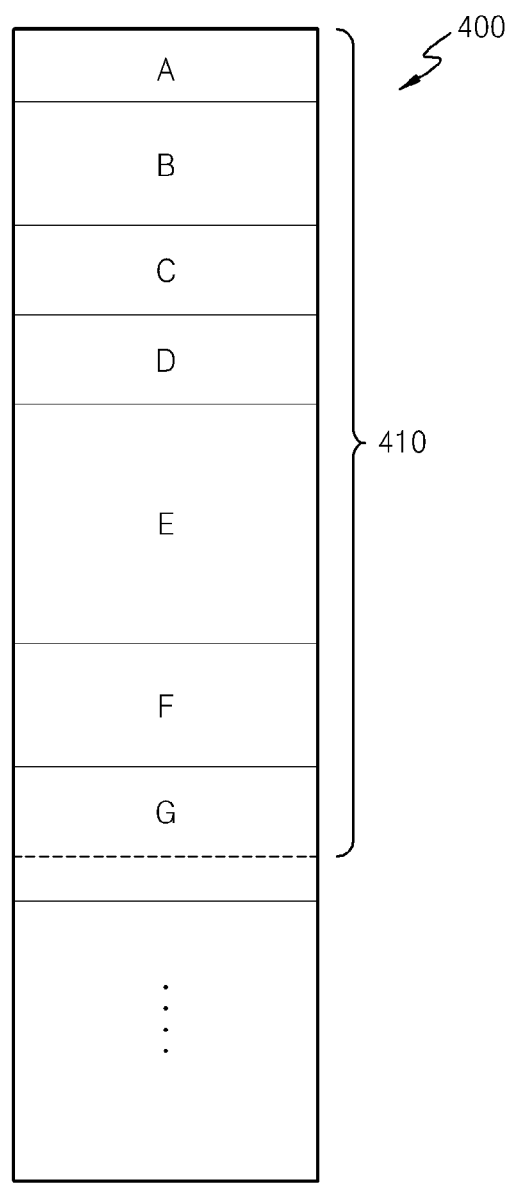
FIG. 4B illustrates an execution file generated by locating the functions shown in FIG. 4A.

FIG. 4A is a table showing a "location order" for a plurality of functions in an application program according to an embodiment of the inventive concept. FIG. 4B correspondingly illustrates an execution file generated following locating the plurality of function, as ordered by the relationships shown in FIG. 4A.

Referring to FIG. 4A, both "number-of-calls information" and "size information" for each one of functions A through L may be seen. The respective number-of-calls information for the functions A to L shown in FIG. 4A may have been determined, for example, using one of the two methods described above with reference to FIG. 3. In FIG. 4A, the functions A to L are sequentially located according to their number-of-calls information—i.e., largest to smallest number-of-calls values. That is, the functions A to L are located in descending order from a largest number-of-calls information value to a smallest number-of-calls information value. FIG. 4B shows an execution file 400 generated by locating functions in the order illustrated in FIG. 4A, (i.e., in the order A, B, C, D, E, F, and then G). Although the functions H to L are not shown in FIG. 4B, they may be sequentially located after the function G.

In FIG. 4B, a first memory region 410 includes a number of functions that may be called using a single-word command (e.g., like the single-word command 200 shown in FIG. 2). That is, functions having respective "start addresses" included in the first memory region 410 may be called using a single-word command. Thus, if the number of address bits of the single-word command 200 is a natural number "N", then the first region 410 will have a size of $2^N$ bytes.

In the description that follows, it will be assumed that functions (A-G) have start addresses included within the first memory region 410 and are called using the single-word command 200. Continuing with the working example, since the number of address bits for the single-word command 200 is assumed to be 10 in FIG. 2, the first memory region 410 has a size of $2^{10}$ bytes. Thus, according to the embodiment shown in FIGS. 4A and 4B, functions A to G having the largest number-of-calls information values may each be called using the single-word command 200.

Figure 5B:
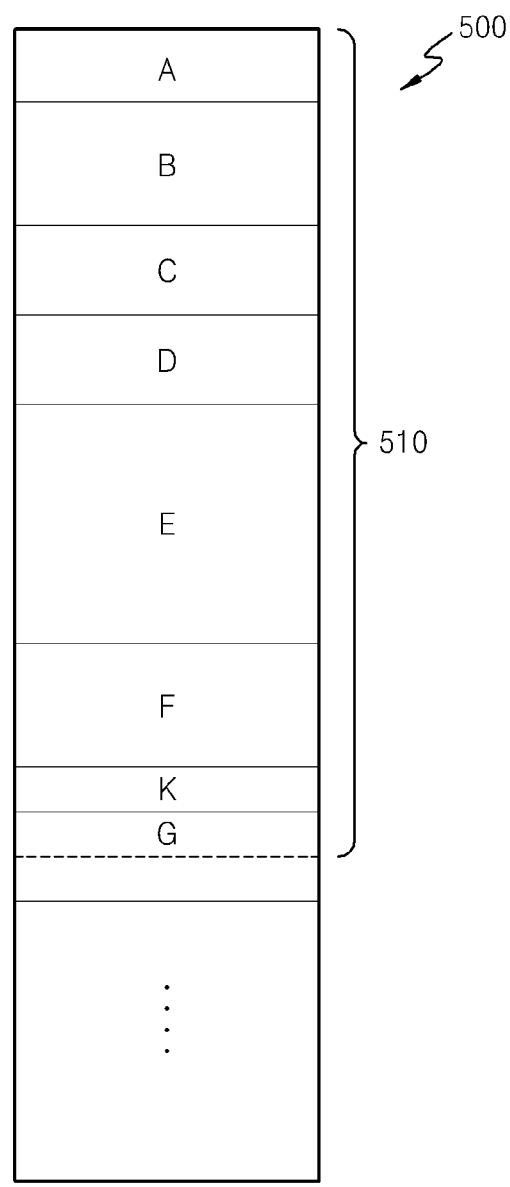
FIG. 5B illustrates an execution file generated by locating the functions shown in FIG. 5A.

With comparative reference to FIG. 4A, the table of FIG. 5A shows another approach to the ordering of functions according to a different embodiment of the inventive concept. FIG. 5B illustrates a corresponding execution file 500 generated after locating the functions shown in FIG. 5A.

Referring to FIGS. 5A and 5B, the same functions (A-L) previously assumed in the example of FIGS. 4A and 4B are again "located" in same manner as in the embodiment shown in FIGS. 4A and 4B. A first memory region 510 shown in FIG. 5B is similar to the first memory region 410 shown in FIG. 4B. However, when the functions A-L are again located in the embodiment shown in FIGS. 5A and 5B, function G is no longer the last included function within the first memory region 510. Instead, one of the smaller sized functions (e.g., function K) has been interposed between function F and function G, despite the fact that function K has a number-of-calls information value much less than functions G, H, I, and J in the illustrated example.

This further inclusion of a starting address for a smaller sized function within the first memory area (i.e., the memory area addressable by a single word command of defined length) maximizes the number of included functions—based on their number-of calls information—without omitting the last sequentially included function (e.g., function G) from the first memory area 510. Thus, in the embodiment shown in FIGS. 5A and 5B, before a "last included function" is located for inclusion within the first memory region 510 (i.e., the size the last included function will consume all remaining space in the first memory region), it is first determined whether any other (one or more) functions having smaller sizes than the remaining memory space, and otherwise excluded from the first memory region that may be located for further inclusion within the first memory region along with the starting address of the last included function.

In one approach, following identification of a last included function in relation to remaining space in the first memory region, a list of "possible inclusion functions" is formed by comparing a "remaining space value" for the first memory region (allowing for inclusion of the starting address of the last included function) with size information for each one of the "yet to be included functions". If the size of a yet to be included function is less than the remaining space value, it is placed on the list of possible inclusion functions. Once all of the yet to be included functions (i.e., all functions not already allocated into the first memory region) has been checked for inclusion on the list of possible inclusion functions, a function on this list having the largest number-of-calls information value will be included within the first memory region 510. This process may be repeated until no yet to be included function will fit within the remaining space of the first memory region, of course taking the last included function into account.

Per the foregoing, it has been assumed that the functions having start addresses included in the first memory region 510 are callable using the single-word command 200 shown in FIG. 2. The remaining memory space in the first memory region 510—prior to the inclusion of function G—is 44 bytes (or 1024 bytes–940 bytes). Thus, given the assumptions manifest in FIG. 5A, there is only one "possible inclusion function" K which is small enough to fit within this remaining memory from among the other "yet to be included" functions (H, I, J, and L). Therefore, function K is included (or "located") in the first memory region 510 prior to the locating of function G. Then, function G is located and the first memory region 510 in the illustrated embodiment is defined. According to the embodiment shown in FIGS. 5A and 5B, it is possible to call not only the functions A through G corresponding to the sequentially largest number-of-calls information values, but also function K by using the single-word command 200.

Figure 6:
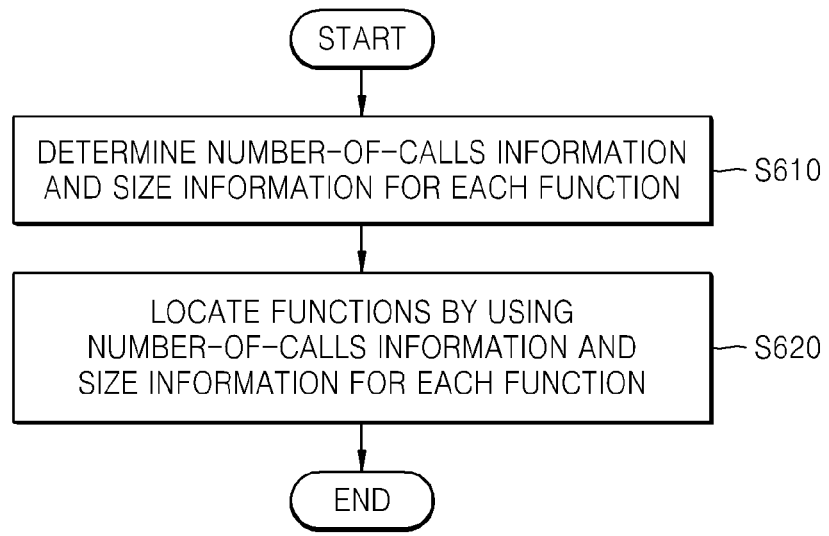
FIG. 6 is a flowchart generally summarizing a method of generating an execution file according to another embodiment of the inventive concept.

FIG. 6 is a flowchart summarizing a method of generating an execution file according to another embodiment of the inventive concept. Referring to FIG. 6, the method comprises determining (as before) number-of-calls information and size information for each one of a plurality of functions (S610). Then, a first memory region is allocated (e.g., populated with the starting addresses for the most often called functions) using not only the corresponding number-of-calls information, but also the corresponding size information for each one of the plurality of functions (S620).

As described with reference to FIG. 1, since the linker 160 knows number-of-calls information and size information for all of the functions, the number-of-calls information and the size information for each of the functions may use the number-of-calls information and the size information for all of the functions, analyzed by the linker 160 shown in FIG. 1. The number-of-calls information for each function may be determined by one of the two methods described with reference to FIG. 3.

After the number-of-calls information and the size information for each function are determined, the functions may be effectively located within a defined first memory region (e.g., such a memory region addressable by a single word command) using the number-of-calls information and the size information for each function to thereby generate an execution file. Consistent with the foregoing, an execution file may be generated according to its constituent "call degree" as determined by its number-of-calls information and size information. That is, according to certain embodiments of the inventive concept, an execution file may be generated by sequentially locating functions based their respective call degrees. For example, a call degree may be defined as a ratio between a number-of-calls information value and a size information value. Thus, a call degree may be defined as a quotient obtained by dividing the number-of-calls information value by a corresponding size information value. However, the inventive concept is not limited thereto and the call degree for each function may be defined as any value reasonably capable of defining a relationship between number-of-calls information and size information.

Figure 7B:
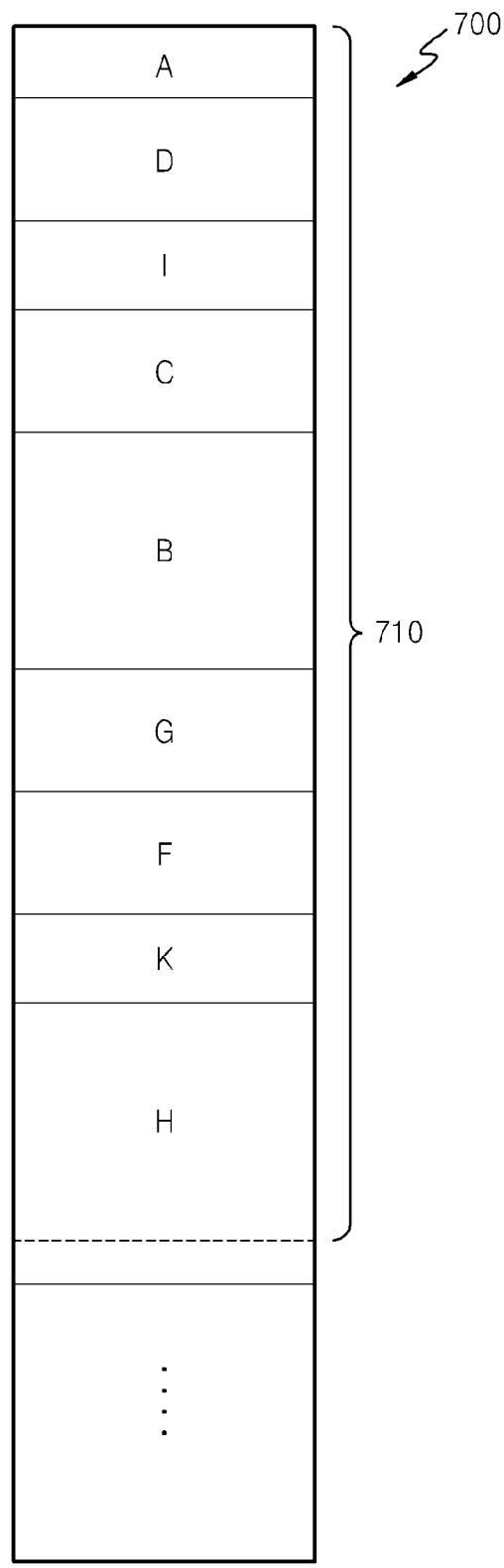
FIG. 7B illustrates an execution file generated by locating the functions shown in FIG. 7A.

FIG. 7A is another table showing yet another order of the functions assumed above (i.e., functions A-L) after location of these functions within memory according to another embodiment of the inventive concept. FIG. 7B illustrates a corresponding execution file 700 generated by locating the functions as shown in FIG. 7A.

Referring to FIG. 7A, respective number-of-calls information and size information for each one of plurality of the functions A through L are listed. The number-of-calls information for the functions A to L shown in FIG. 7A may be determined by using one of the two methods described with reference to FIG. 3. As described with reference to FIG. 6, a call degree for each function is determined using a number-of-calls information value and a size information value for each of the functions A through L. In the illustrated embodiment shown in FIG. 7A, the call degree is simply defined as a ratio between the number-of-calls information (i.e., some counted calling value) and the size information (physical memory size occupied by the function in bytes). These are, however, merely examples of values that may be used to generate call degree values within the context of the inventive concept.

With reference to FIGS. 7A and 7B, the functions A to L may then be sequentially located according to the calculated call degrees for each one of the plurality of functions A to L. That is, the functions A to L are located within the first memory region 710 in descending order from a largest call degree value to a smallest call degree value. As shown in FIG. 7B, the resulting execution file 700 generated by this location of functions A through L ranges in order A, D, I, C, B, G, F, K, and then H. Although the functions E, L, and J are not shown in FIG. 7B, they may be located sequentially after the function H.

A first memory region 710 shown in FIG. 7B is again assumed to be a memory region addressable by the single-word command 200 shown in FIG. 2. That is, the first memory region 710 is the same as the first memory region 410 shown in FIG. 4B and the first memory region 510 shown in FIG. 5B. In the following description, it will be assumed that functions having start addresses included within the first memory region 710 are called using the single-word command 200 shown in FIG. 2. Since the number of address bits of the single-word command 200 shown in FIG. 2 is 10, the region 710 may have a size of $2^{10}$ bytes. Thus, according to the embodiment shown in FIGS. 7A and 7B, the functions A, D, I, C, B, G, F, K, and H having the largest call degree values may be called by using the single-word command 200.

Figure 8B:
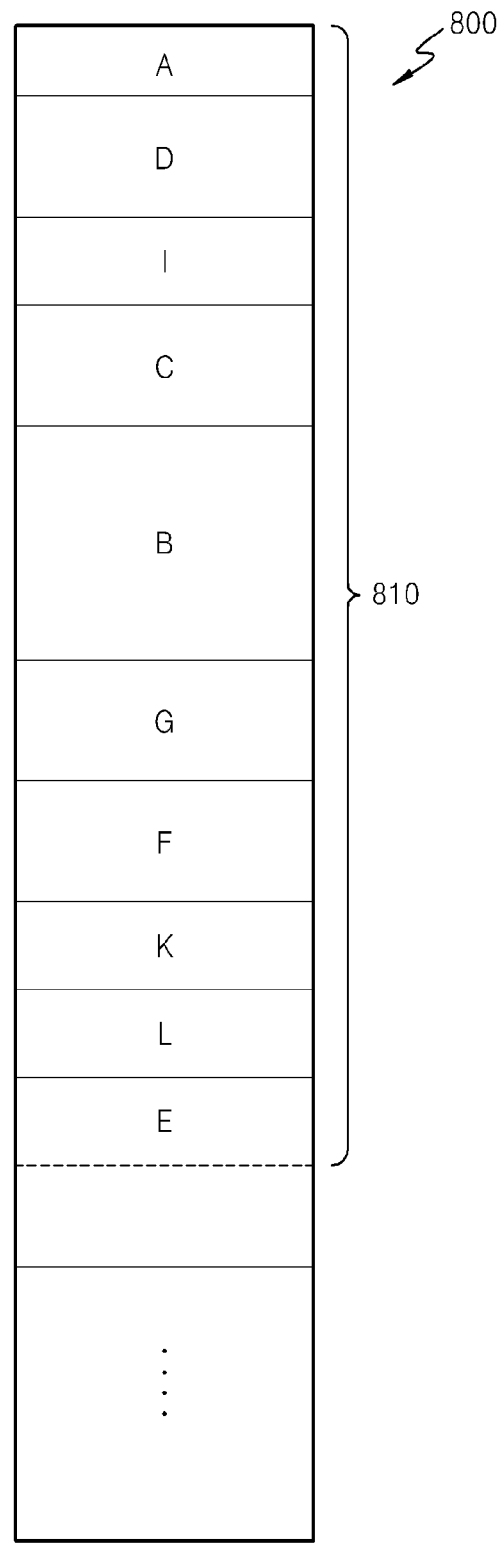
FIG. 8B illustrates an execution file generated by locating the functions shown in FIG. 8A.

FIG. 8A is a yet another table showing an order in which functions are located according to another embodiment of the inventive concept. FIG. 8B illustrates an execution file 800 generated by locating the functions shown in FIG. 8A.

Referring to FIGS. 8A and 8B, in an embodiment shown in FIGS. 8A and 8B, functions are located in the same manner as in the embodiment shown in FIGS. 7A and 7B. A first memory region 810 shown in FIG. 8B is the same as the first memory region 710 shown in FIG. 7B. When the functions are located in the same manner as in the embodiment shown in FIGS. 7A and 7B, a last included function in the first memory region 810 was function H.

However, and as explained above in some detail, in the embodiment shown in FIGS. 8A and 8B, before the last included function is located in the first memory region 810, it is determined whether there are functions having smaller sizes than the remaining space from among non-located functions. If there are such functions having smaller sizes than the remaining space, a function corresponding to the largest number-of-calls information from among the functions having smaller sizes than the remaining space is located first and then a function corresponding to the largest number-of-calls information from among the not yet included located functions is located.

Thus, consistent with the foregoing, it is assumed that the functions having start addresses included in the first memory region 810 may be called using the single-word command 200 shown in FIG. 2. The remaining space prior to locating function H after locating of the function K is 194 bytes (1024 bytes–830 bytes), and thus there is only one function L which has a smaller size than the remaining space from among the non-located functions. Therefore, the function L is located after locating of the function K. After locating of the function L, the remaining non-located functions are the functions E, H, and J. Therefore, after locating of the function L, the function E corresponding to the largest number-of-calls information from among the functions E, H, and J is located. According to the embodiment shown in FIGS. 8A and 8B, it is possible to call not only the functions A, D, I, C, B, G, F, and K corresponding to large call degrees but also the functions L and E corresponding to large number-of-calls information from among the remaining functions, by using the single-word command 200.

However, in the embodiment shown in FIGS. 8A and 8B, instead of determining whether there are functions having smaller sizes than the remaining space from among non-located functions prior to last locating of the function in the region 810, a function corresponding to the largest number-of-calls information from among the non-located functions may be located in place of the function located last. For example, in the embodiment shown in FIGS. 7A and 7B, prior to last locating of the function H after locating of the function K, the function E corresponding to the largest number-of-calls information from among the remaining non-located functions H, E, L, and J may be located. In this case, it is possible to call not only the functions A, D, I, C, B, G, F, and K corresponding to large call degrees but also the function E corresponding to the largest number-of-calls information from among the remaining functions, by using the single-word command 200.

Figure 9:
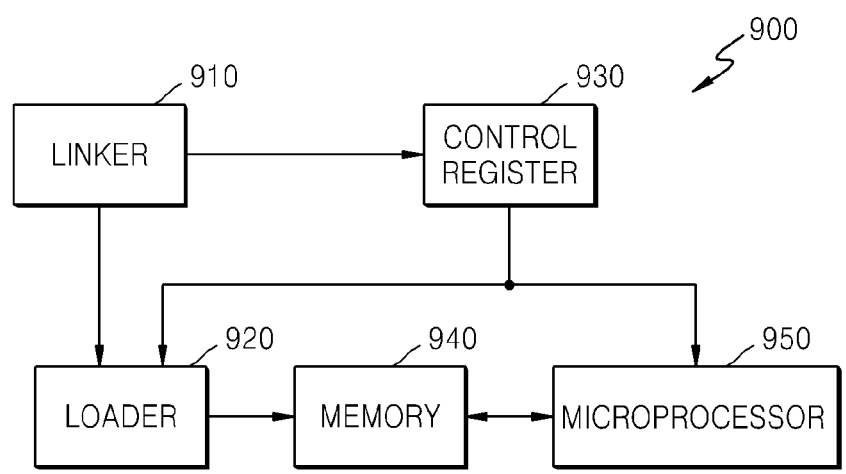
FIG. 9 is a block diagram of a system device capable of incorporating a method of generating an execution file according to an embodiment of the inventive concept.

FIG. 9 is a block diagram of a system 900 according to an embodiment of the inventive concept. Referring to FIG. 9, system 900 comprises a linker 910, a loader 920, a control register 930, a memory 940, and a microprocessor 950.

The linker 910 generates an execution file using one or more methods consistent with an embodiment of the present inventive concept (e.g., as described with reference to FIGS. 3 to 8B). The loader 920 stores the execution file generated in the linker 910 in the memory 940. The microprocessor 950 may call and use functions of the execution file stored in the memory 940 if the execution file is executed.

When the execution file generated in the linker 910 is stored in the memory 940, it may be stored starting with an arbitrary address. That is, a start address of a function first located in the execution file may not start at an address number 0. In this case, the control register 930 may be used. A start address position of the execution file is stored in the control register 930. The start address position of the execution file may be determined by the linker 910 or a developer.

For example, it is assumed that the execution file can be stored from an address number $2^{10}$. In this case, the loader 920 uses a value stored in the control register 930 so that the start address of the execution file may be the address number $2^{10}$, and then stores the execution file in the memory 940. The microprocessor 950 may call and use functions of the execution file stored in the memory 940 by using the value stored in the control register 930. For example, if a single-word command indicates calling of a function having a start address number 0, a function having a start address number $2^{10}$ may be called because the function having the start address number 0 is the same as the function having the start address number $2^{10}$.

The exemplary embodiments of the inventive concept have been disclosed in the drawings and specification. Although specific terms have been used herein, they are used in a descriptive sense only and not for purposes of limiting meaning or the scope of the inventive concept being set forth in the following claims. Therefore, those of ordinary skill in the art will understand that various changes may be made therein without departing from the scope of the inventive concept. Accordingly, the scope of the inventive concept is defined by the appended claims.

What is claimed is:

1. A method of generating an execution file for an application program comprising a plurality of functions, the method comprising:
   determining a number-of-calls information value for each one of the plurality of respectively indicating a frequency with which each one of the plurality of is called by other functions in the plurality of functions; and
   determining a size information value for each one of the plurality of functions;
   generating a call degree for each one of the plurality of functions using the number-of-calls information values and the size information value; and
   generating the execution file by locating in a first memory region of a memory, a sub-plurality of functions selected from the plurality of functions according to respective call degrees, wherein the first memory region is fully addressable by a single-word command, and the respective functions of the sub-plurality of functions are sequentially and consecutively located in the first memory region on a function by function basis beginning at a start address for the first memory region.

2. The method of claim 1, wherein determining the respective number-of-calls information for each one of the plurality of functions comprises, for each one of the plurality of functions equating as respective number-of-calls information, an actual number of calls made during execution of the application program.

3. The method of claim 1, wherein determining the respective number-of-calls information for each one of the plurality of functions comprises, for each one of the plurality of functions determining as respective number-of-calls information, an actual number of calls made during execution of the application program multiplied by at least one weighting factor.

4. The method of claim 1, further comprising:
   determining size information for each one of the plurality of functions,
   wherein the generating of the execution file is accomplished by locating in the first memory region each one of the plurality of functions according to its respective number-of-calls information and its size information.

5. A method of generating an execution file for an application program comprising a plurality of functions, the method comprising:
   determining a number-of-calls information value for each one of the plurality of functions respectively indicating a frequency with which each one of the plurality of functions is called by other functions in the plurality of functions;
   determining a size information value for each one of the plurality of functions;
   generating a call degree for each one of the plurality of functions using the number-of-calls information value and the size information value; and
   generating the execution file by locating in a first memory region of a memory a sub-plurality of functions selected from the plurality of functions according to respective call degrees, wherein the first memory region is fully addressable by a single-word command, and the respective functions of the sub-plurality of functions are sequentially and consecutively located in the first memory region on a function by function basis beginning at a start address for the first memory region.

6. The method of claim 5, wherein the call degree for each one of the sub-plurality of functions is defined as a ratio between its number-of-call information value and its size information value.

7. The method of claim 5, wherein the respective functions of the sub-plurality of functions have the highest respective call degrees.

8. The method of claim 5, wherein the respective functions of the sub-plurality of functions have the highest respective call degrees, except for at least one last included function of the sub-plurality of functions.

9. A method of generating an execution file for an application program comprising a plurality of functions, the method comprising:
   determining respective number-of-calls information values and size information values for each one of the plurality of functions; and
   generating the execution file by locating a sub-plurality of functions selected from the plurality of functions in a first memory region of a memory, wherein the first memory region is fully addressable by a single-word command and generating the execution file comprises;
   (a) sequentially locating the sub-plurality of functions on a function by function basis beginning at a start address for the first memory region according to corresponding number-of-calls information values;
   (b) upon sequentially locating functions selected from the plurality of functions sufficient to fill the first memory region according to corresponding number-of-calls values, identifying a last included function and a list of yet to be included functions;
   (c) determining a remaining space value in the first memory region prior to locating the last included function;
   (d) comparing size information for each one of the yet to be included functions with the remaining space value; and
   (e) locating at least one of the yet to be included functions having size information less than the remaining space value in the first memory region before locating the last included function in the first memory value.

10. A system comprising:
    a single level memory having a first memory region fully addressable by a single-word $2^N$ command and configured to store an execution file;
    a linker configured to determine number-of-calls information values for each one of a plurality of functions in an application program, and generate the execution file by sequentially locating in the first memory region a sub-plurality of functions selected from the plurality of functions based on respective number-of-calls information values, wherein the linker is further configured to determine size information values for each one of the plurality of functions, and generate the execution file by sequentially locating in the first memory region each function in the sub-plurality of functions based on its respective number-of-calls information value and its respective size information value; and a microprocessor configured to call at least one of the sub-plurality of functions located in the execution file using the single-word $2^N$ command.

11. The system of claim 10, further comprising:

a control register configured to store a start address for the execution file.

* * * * *